June 23, 1959 G. A. ROGGE 2,891,465
BARBECUE DEVICE
Filed Oct. 19, 1956 5 Sheets-Sheet 3
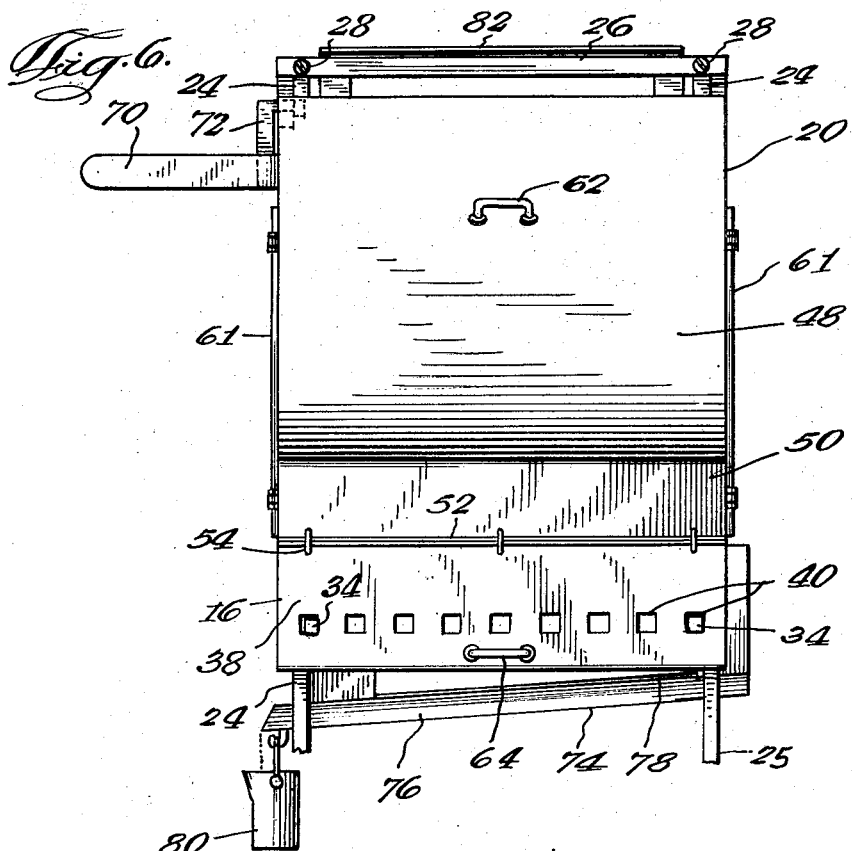
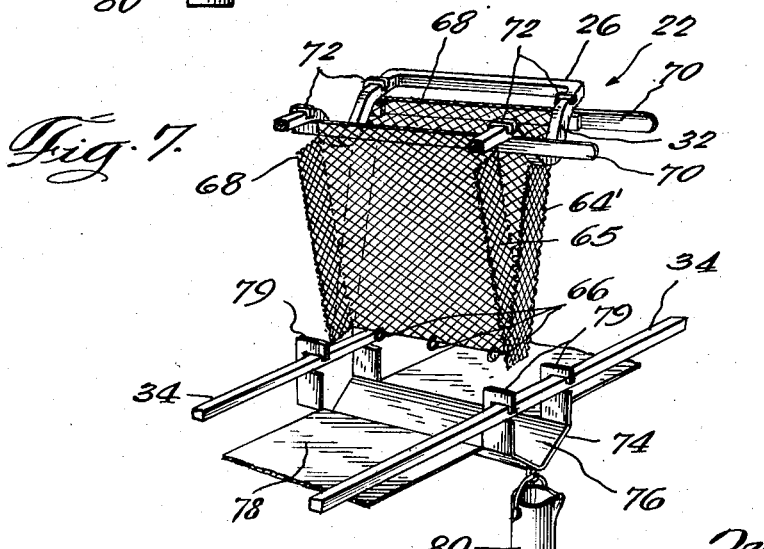

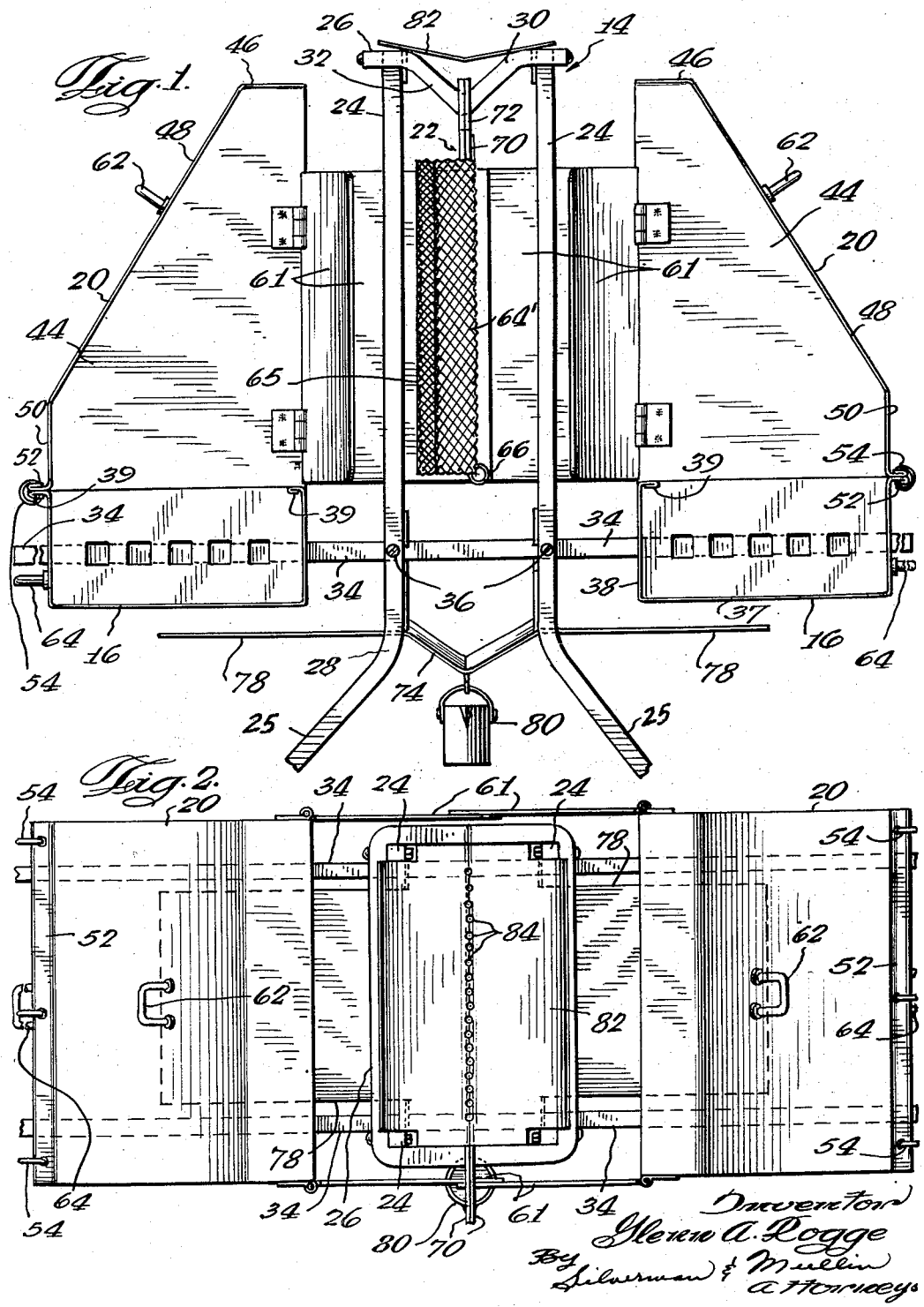

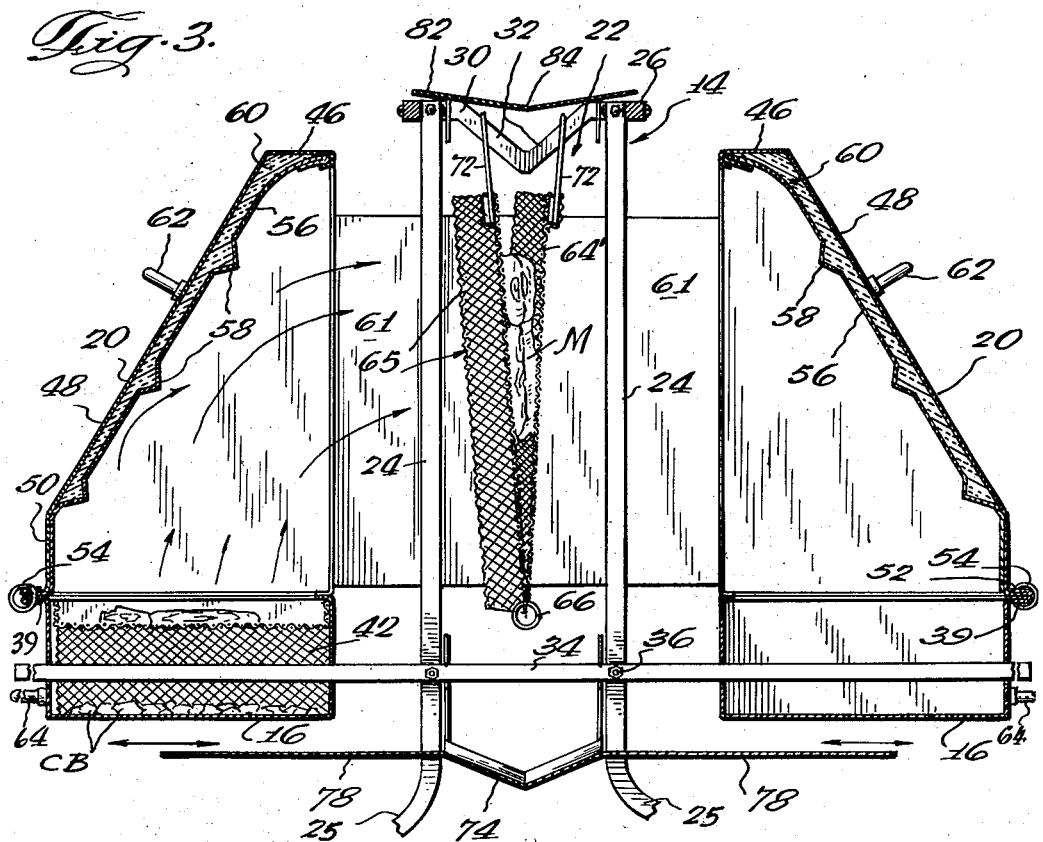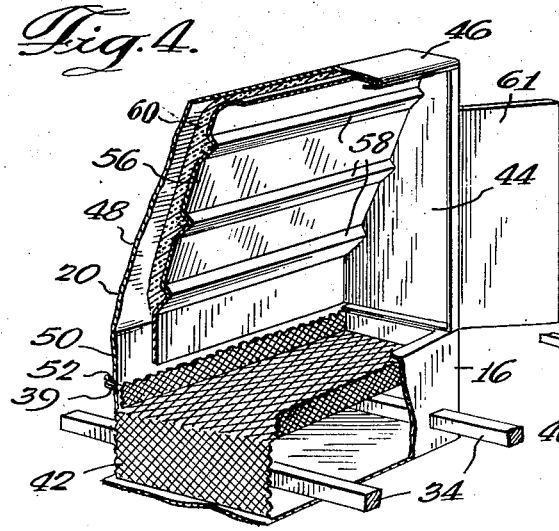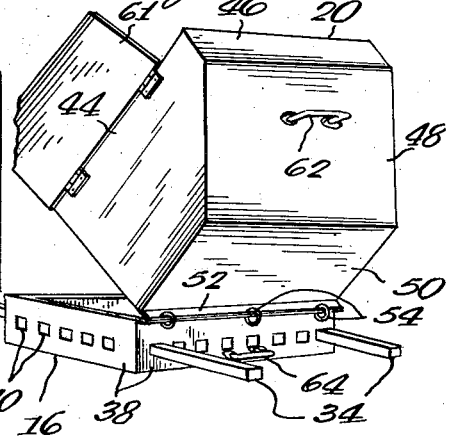

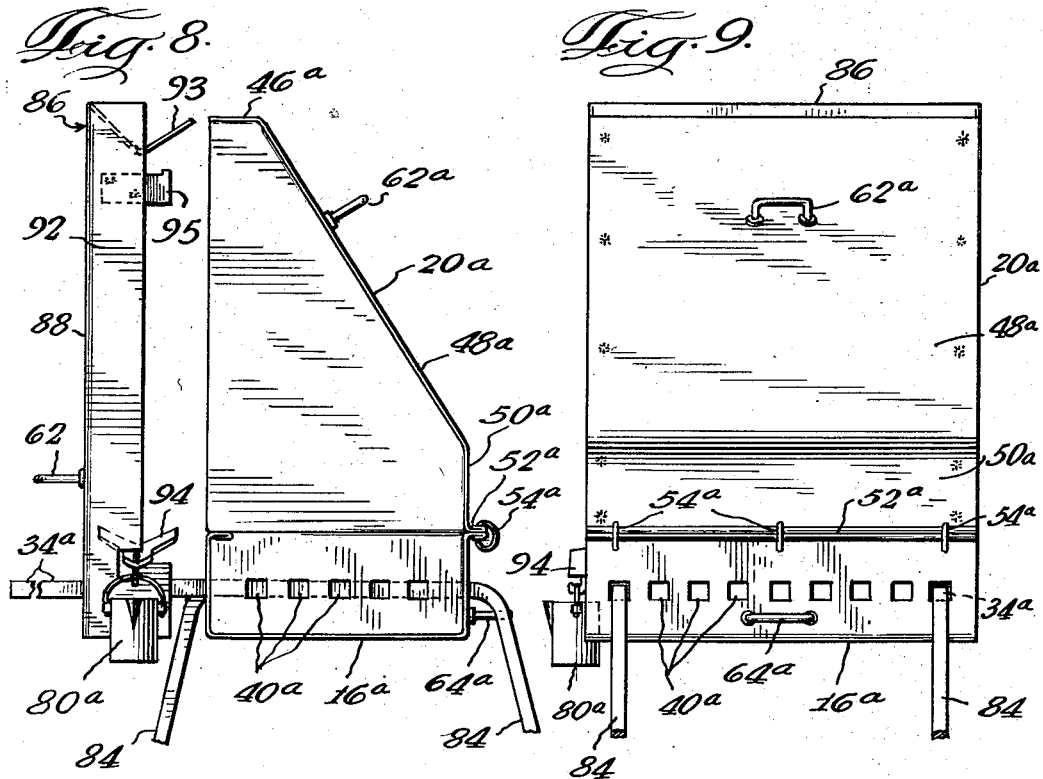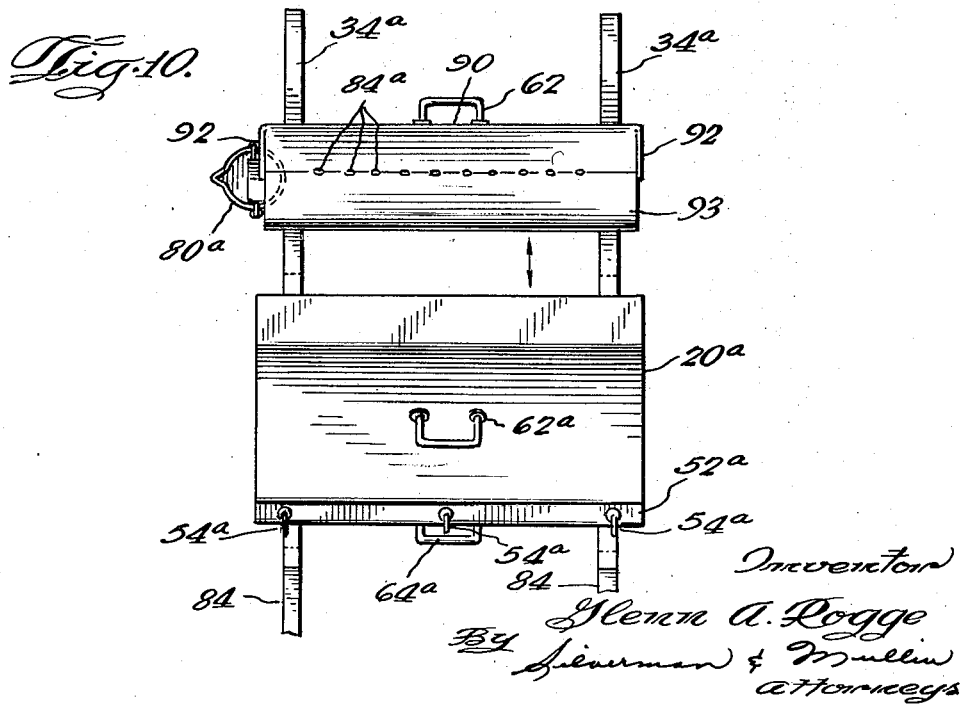

June 23, 1959  G. A. ROGGE  2,891,465
BARBECUE DEVICE

Filed Oct. 19, 1956  5 Sheets-Sheet 5

Inventor
Glenn A. Rogge
By
Silverman & Mullin
Attorneys

United States Patent Office 2,891,465
Patented June 23, 1959

2,891,465

BARBECUE DEVICE

Glenn A. Rogge, Chicago, Ill., assignor of fifty percent to Roland Melander, Joliet, Ill., twenty-five percent to William H. Connor, and twenty-five percent to William T. Connor.

Application October 19, 1956, Serial No. 617,069

12 Claims. (Cl. 99—345)

This invention relates to improvements in barbecue devices and particularly to portable barbecue devices such as are used around the home as well as by campers, picnickers and the like. More particularly, the invention pertains to improvements in such devices wherein broiling, cooking, roasting or toasting is accomplished by indirect heat reflected from a heat source and with means for controlling or adjusting the intensity or degree of said heat.

It is well known that in recent years outdoor cooking or barbecuing has become most popular both around the home as well as in outdoor recreational areas by campers, sportsmen, picnickers, and the like. As a result, numerous and varied types of barbecue devices have been developed some of which have proven fairly satisfactory and others of which have been characterized by objectionable features which have discouraged their more universal application.

Although, as was stated hereinabove, prior constructions have varied in their effectiveness and desirable characteristics, all of such devices have been characterized by the inflexibility or lack of refinement in the means for controlling or regulating the cooking operation. Thus, whereas in the usual modern kitchen range the heat source may be varied or regulated so that any desired heat may be utilized, in the outdoor barbecue device, wherein the heat source is usually a charcoal fire, heretofore no suitable means for regulating the intensity or degree of the heat applied to the food being cooked was provided.

It is therefore an important object of this invention to provide a portable barbecue device having means for regulating the intensity or degree of heat applied to the object being cooked.

An object relating to the foregoing is to so construct a barbecue device that the heat source may be readily moved forward or away from the food whereby to raise or lower the temperature of the heat as it is delivered to the food object being cooked.

Another objectionable feature heretofore prevalent in most barbecue devices was the fact that the food was cooked directly over the heat source. Thus, drippings or food particles were wont to fall into the fire during the cooking operations. This was objectionable since it affected the uniformity of the heat, caused undesirable smoking and excessive vapor and odoriferous discharges and often caused the charcoal briquettes to flare up, sometimes searing the food as it was being cooked.

It is therefore another important object of this invention to afford a barbecue device in which the heat is applied indirectly by reflection so that the food is not positioned over the heat source, but instead is positioned adjacent thereto.

A further object is to provide a barbecue device having means for suspending the food vertically, thereby insuring more flavorful cooking and a greater degree of uniformity therein. A related object is to provide means for collecting the juices from the food as it is being cooked and further means for returning said juices to the food to further increase its flavor.

Still another object is to afford a barbecue device which may be readily knocked down for purposes of portability and as readily assembled.

Still a further object is to provide a barbecue device in which both sides of the food item may be cooked or barbecued simultaneously, thereby speeding up the cooking process considerably.

Yet another object is to afford a novel device for supporting the food in a vertical position during the cooking operations. A related object is to so construct and design said meat or food holding device that it may be readily removed from the barbecue device or reinserted therein as desired.

Yet a further object is to provide an embodiment of the invention of somewhat simplified construction whereby the portability is increased and the initial cost considerably decreased.

Still other objects are to afford embodiments in which the food may be positioned horizontally while still maintaining the feature which enables the heat source to be regulated and also retaining the feature of heating by reflection rather than by direct heat.

Finally, another object is to provide a barbecue device of the character described which is sturdy in construction, effective, attractive, and relatively inexpensive.

With the foregoing and other objects in view which will appear as the description proceeds, the invention consists of certain novel features of construction, arrangement, and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages, should be readily understood and appreciated.

Referring to the drawings in which the same characters of reference are employed to indicate corresponding or similar parts throughout the several figures of the drawings:

Fig. 1 is a front elevational view of the barbecue device embodying my invention;

Fig. 2 is a top plan view;

Fig. 3 is a vertical sectional view of the device in Fig. 1 but showing the same in operation;

Fig. 4 is a perspective view of one of the fire boxes and attached reflector with portions broken away to show certain details of construction;

Fig. 5 is another perspective view of one of the fire boxes and attached reflector showing the hinged connection therebetween;

Fig. 6 is a side elevational view of the device;

Fig. 7 is a perspective view of the food retaining means and collecting trough shown mounted in operational position;

Fig. 8 is a front elevational view of a modified form of the device of Fig. 1;

Fig. 9 is a side elevational view thereof;

Fig. 10 is a top plan view thereof;

Figure 11:
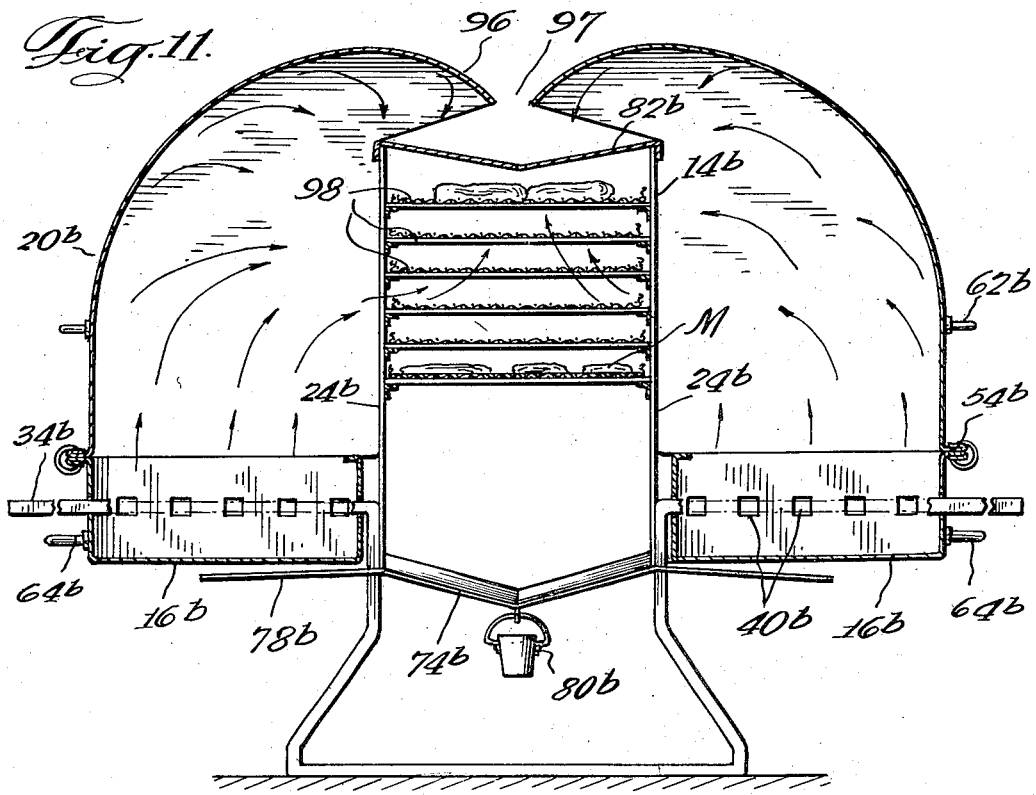
Fig. 11 is a vertical sectional view of another embodiment of the invention.

Referring first to Fig. 1 of the drawings, the barbecue device comprises essentially a central framework designated generally by reference numeral 14, with a pair of fire boxes such as 16 slideably mounted one on either side of said central frame 14. A pair of reflector members such as 20 may be hingedly mounted on said fire boxes 16 and positioned adjacent the central framework. The meat, or similar food items, are suspended vertically in the framework 14 by means of a food holding device indicated generally by reference numeral 22, as shown in Fig. 3 of the drawings. Thus, the heat from the fire box 16 is reflected indirectly on to the meat or food as shown by the arrows in Fig. 3 of the drawings.

Turning now to a more detailed description of the barbecue device structure, attention is directed first to the central framework 14 which may comprise a plurality of upright rods or standards 24 having their lower end portions 25 bent outwardly as at 28 to afford a solid, sturdy supporting base. Each pair of standards 24 may be joined together by means of a rectangular-shaped yoke such as 26 joined thereto by means of bolts or screws such as 28. The yoke 26 may be formed with end connecting segments such as 30 which join together each pair of opposing standards 24 as shown in Figs. 1 and 3 of the drawings. These end connector segments 30 may be formed with central V-shaped depending sections such as 32, the function of which will become apparent as the description proceeds.

At an intermediate bottom portion of the standards 24 a pair of horizontal rods such as 34 may be positioned in parallel spaced relationship one with the other as shown in Fig. 2 of the drawings. These rods 34 may be bolted to the standards 24 as by any conventional securing means such as the bolts 36. It will be noted in Figs. 1, 2 and 3 of the drawings that the rods 34 are elongated and extend outwardly a considerable distance from each side of the central upright framework 14. Again, the function thereof will become apparent as the description proceeds.

Each of the fire boxes 16 may be rectangular in shape and formed with a bottom wall 37 and with integrally-formed sidewalls such as 38, the top edges of which are flanged as shown at 39 in Fig. 1 of the drawings. Intermediate of the height of the side walls 38, a plurality of openings such as 40 may be formed in spaced relationship and encircling the box. The openings in each wall are aligned with the openings in the opposite wall and are so spaced and of such a size as to permit the support rods 34 to be positioned through pairs of such openings as shown in Figs. 1, 2, 3, 4 and 5 of the drawings. Thus, it will be noted that the fire boxes 16 are slideable on the rods 34 and are likewise supported thereby. Hence, the fire boxes 16 may be moved outwardly away from the centrally supported food in the holder 22, or towards it, as desired. This, of course, affords admirable means for regulating or controlling the intensity and degree of the heat delivered to the meat being cooked. The openings 40 also serve as draft openings through which air may be admitted for combustion of the fuel such as the charcoal briquettes CB, as shown in Fig. 3 of the drawings. A protective grid, such as 42, may be fitted into the box 16 and over the coals CB, as shown in Figs. 3 and 4 of the drawings. This grid 42 may be made of expanded metal or any other suitable material, and is of course removable. If desired, food may be placed on this grid and broiled simultaneously with the food in the vertical holder 22.

The reflector 20 may be made of any suitable shape, but as shown and illustrated in the several figures of the drawings, it comprises an enclosure defined by a pair of side walls 44, a top wall 46, and a front wall having an inclined segment 48 and a vertical bottom segment 50. The side wall segment 50 has its bottom edge outwardly flanged as at 52, similar to the fire box flange 39. These two flanges may then be hingedly connected by any suitable means, such as for example the rings 54. A reflector plate such as 56 may be positioned inside of the reflector member 20 and shaped to afford a reflective surface designed to achieve maximum efficiency in reflecting the heat from the fire box to the food. It will be noted that this reflector member 56 is formed with a plurality of outwardly protruding ridges such as 58. It has been determined that such ridges are necessary in order to achieve uniform, efficient heat reflection. If desired, insulating material such as 60 may be inserted in the space between the wall 48 of the reflector and the reflector plate 56 as shown in Fig. 3 of the drawings. Hinged doors such as 61 may likewise be mounted on the side walls 44 of the reflectors 20 whereby to enclose the central frame 14.

Handles, such as 62 and 64 may be positioned on the reflector 20 and the fire box 16. By grasping the fire box handle 64 the entire assembly consisting of the fire box and the reflector member 20 may be pulled away from the food support or pushed towards it. Likewise, the handle 62 on the reflector member enables the entire reflector enclosure to be swung outwardly about its hinge axis for ready access to the meat in the central support framework 14.

Attention is now directed to those figures which best illustrate the meat or food holding device by means of which the same may be suspended vertically in cooking position. It will be noted in Fig. 7 of the drawings that this device, indicated generally by reference numeral 22, comprises a pair of trays such as 64' and 65 nested one into the other and hingedly connected at the bottom edges by means of a plurality of spaced-apart rings such as 66. Thus, the trays 64' and 65 may be pivoted about a bottom axis extending through the hinge rings 66. The top edges of the trays 64' and 65 are affixed respectively to a pair of handle strips such as 68. The handle members 68 comprise strips which extend across the entire width of the trays 64' and 65 with end portions protruding a considerable distance at one end thereof from the edge of said trays whereby to afford proper handles 70 as shown in Figs. 6 and 7 of the drawings. The operator may grasp these handles and thereby remove or insert the meat holder 22 within the framework 14 as desired.

To support the meat holder 22 in the barbecue device, it will be noted that the handle strips 68 may each be formed with a pair of hook members, such as 72, one of each of said hooks being positioned so that the same may hook onto the end members 30 of the yoke 26. Since the end members 30 are formed with inclined walls comprising the V-shaped segment 32, the hooks 72 tend to slide downwardly on the inclined segments toward each other thereby compressing the meat M between the walls of the trays 64 and 65. This tends to hold the meat in proper position during the cooking operation. Of course, when the meat holder is removed from the barbecue device the two trays may be swung away from each other about its pivotal axis 66 and the meat may then be readily removed from the trays.

During the cooking operation, as the meat is heated and cooked, the juices therefrom drip down and are collected by means of a trough member indicated generally by reference numeral 74. This trough member is formed with a V-shaped central trough section 76 positioned directly below the meat holder 22. The trough may be formed from sheet metal and is provided with flat reflector plates such as 78 extending outwardly from the central V-shaped trough section. These reflector plates 78 extend out and under at least a portion of the fire boxes 16. The function of these plates is to prevent excessive loss of heat through the bottom walls of the fire box, and to reflect any such waste heat up onto the meat. This, of course, increases the efficiency of the barbecue device. Hook members such as 79 may be used to hang the trough member 74 from the rods 34 in substantially stationary but removable relationship.

In Figs. 1 and 6 of the drawings, it will be noted that the trough 74 is inclined towards one end thereof and a cup or bucket such as 80 hung thereon. It should be apparent that this facilitates the collection of the juices into the bucket 80. Periodically, the juices in the bucket 80 may be returned to the meat by pouring the same over a top trough member 82 having openings such as 84 formed in the apex of the trough and in spaced relationship along the entire width thereof. Thus, the juices are evenly distributed over the meat, thereby adding considerably to the flavor thereof.

In Figs. 8, 9 and 10, there is illustrated another embodiment of the invention. In this embodiment similar parts are identified by like numerals with the added suffix "a."

In this modification, only a single fire box and reflector member are utilized, but again the same basic principle wherein the fire box is movable with respect to the food is employed. Again, it should be noted that by employing such a structure, the intensity of the heat delivered to the food may be regulated.

In this modification the fire box 16a is likewise mounted on a pair of horizontal bars 34a, said bars in turn supported by a plurality of legs 84. Mounted in fixed relationship on the bars 34a is a combination reflector and meat supporting device indicated generally by reference numeral 86. The member 86 is in the form of an elongated upright tray 88 having a back wall 90 and side walls 92. Top and bottom troughs such as 93 and 94 are permanently affixed to the tray 86 in the manner shown in the drawings. These troughs perform the same function as the drip trough 74 and the top trough 82 of the previously described embodiment. Thus, the juices are collected by a drip cup or pail 80a, hung on one end of the bottom trough 94, and then returned to the meat by pouring the same in the top trough 93. Hook supporting devices such as 95 are affixed to the side walls 92 of the tray 86. These support devices 95 cooperate with the hooks 72 of the meat supporting member 22 (member 22 is not shown in the drawings of this embodiment, but may be the same as the supporting members described in the previous embodiment).

The operation of this modification is identical with the previously described embodiment except that the meat is cooked one side at a time. The side which is exposed to the reflector member 20a usually receives more intense heat than the side which is positioned away therefrom and towards the side 88 of the central reflector tray. Thus, it is usually necessary to reverse the meat support member in order to expose both sides to the reflector tray 20a in sequence, thereby insuring even cooking on both side of the meat.

In Fig. 11 of the drawings, there is illustrated another modification of the barbecue device in which the meat may be supported horizontally on trays. Again, similar parts are indicated by like numerals, but this time with the added suffix "b."

In this embodiment the reflector member 20b may be formed of arcuate shape with the upper end portions 96 extended out over the top of the framework 14b leaving a rather narrow gap 97 therebetween. It will be noted that this gap is positioned directly over the apex of the top trough 82b for a purpose which will be later revealed.

It will further be noted that the central framework 14b is somewhat wider than the framework of the first described embodiment. It should further be noted that extended between the upright standards 24b of the central frame 14b are positioned a plurality of grills or racks such as 98, positioned one above the other in spaced relationship. On these grills 98 may be placed the meat M or other food items so that the same may again be heated by reflected heat from the arcuate walls of the reflector members 20b with the heat circulating in the manner shown by arrows in Fig. 11 of the drawings. It should be noted that the extended reflector top segments 96 provide means for also reflecting heat downwardly onto the trays 98.

As in the previously described embodiments, the juices from the cooking meat are collected by means of the trough 74b into the bucket 80b. Periodically these collected juices may then be poured through the gap 97 onto the trough 82b and distributed therethrough onto the meat M.

It should be noted that the reflector members 20b being arcuately formed to afford an efficient heat reflecting shape permit the elimination of a separate reflector member such as reflector 56 of the previously described embodiments.

Figure 12:
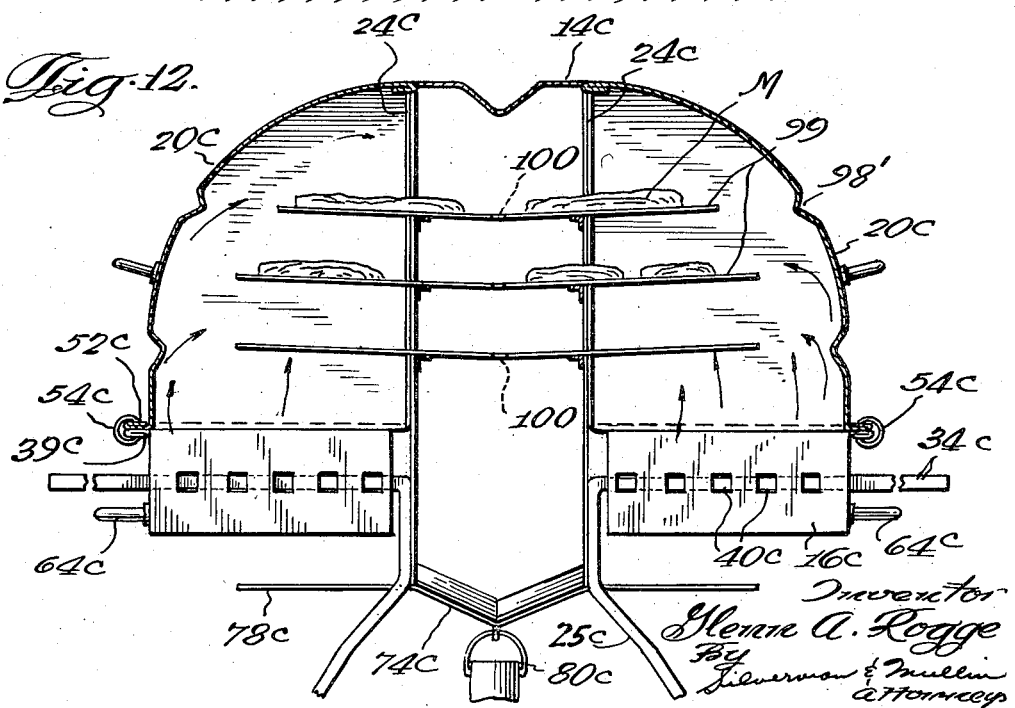
Fig. 12 is a vertical sectional view of still another embodiment of the invention.

In Fig. 12 of the drawings there is illustrated still another modification of the barbecue device. In this modification, again similar parts are indicated by like numerals, but this time with the added suffix "c."

In this embodiment the reflector members 20c are again arcuately shaped, but may be formed with indentations such as 98' providing baffles on the inner side thereof for more efficiently directing the reflected rays from the reflector walls. Again horizontal trays such as 99 are provided, but this time it will be noted that the trays 99 are inclined towards their centers at the apex of which drip openings such as 100 are provided. It will further be noted that the trays 99 extend outwardly beyond the standards 24c, and over at least a portion of the fire boxes 16c. Thus, the heat is transmitted to the meat M on the trays 99 not only by reflection from the reflectors 20c, but also by convection directly from the heat source in the fire boxes. This modification, because of its multiple type heating, affords means for accelerating the cooking process. Moreover, although the trays 99 extend out over the fire boxes 16c, drippings from the meat M into the fire boxes is held to a minimum for the reason that the trays 99 slope inwardly to the center. Thus the drippings run down through the central openings 100 and may be collected by the bucket 80c.

From the foregoing description and drawings, it should be apparent that I have provided a novel, efficient, practical cooking apparatus especially designed for barbecuing and broiling wherein the food is cooked by indirect heat reflected from heat sources positioned on one or both sides of a central framework, the food being suspended either vertically in the central framework or supported horizontally thereon. Of prime importance is the novel construction whereby the heat source may be moved with respect to the stationary centrally supported food in such a manner as to afford means for regulating or controlling the intensity and degree of heat delivered to the food surfaces.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. In a cooking device of the character described, a supporting framework, food supporting means positioned in said framework, at least one firebox supported in horizontal slidable relationship adjacent but spaced in a horizontal plane from said food supporting means, and a reflector hood mounted on said firebox and open only at the side adjacent said food supporting means, said reflector hood adapted to direct heat from said firebox onto the food into said food supporting means, said reflector hood comprises a housing hingedly affixed to said firebox for ready access to said food-supporting-means, and said firebox comprises a substantially rectangular enclosure defined by a bottom and four vertical walls, said walls formed with spaced openings, said openings in one wall aligned with similar openings in the opposite wall.

2. In a cooking device of the character described, a supporting framework, food supporting means positioned in said framework, at least one firebox supported in horizontal slidable relationship adjacent but spaced in a horizontal plane from said food supporting means, and a reflector mounted on said firebox and adapted to direct heat from said firebox onto the food in said food supporting means, said reflector comprising a housing hingedly affixed to said firebox for ready access to said food supporting means, said firebox comprising a substantially rectangular enclosure defined by a bottom and four vertical walls, said walls formed with spaced openings, said openings in one wall aligned with similar openings in the opposite wall, said framework including a pair of horizontally-positioned outwardly-protruding rods, said rods extending through pairs of the aligned openings in the walls of said firebox, whereby the firebox is slideably supported thereon.

3. The cooking device of claim 2 in which a trough-shaped basting member is positioned in said framework over the food-supporting-member and a trough-shaped drip member is likewise positioned in said framework below said last-mentioned member.

4. The cooking device of claim 3 in which said drip member is formed with at least one reflector plate extending out under said fire-box and a juice-collecting member is removably hung from said drip member.

5. A portable cooking device of the character described comprising a central collapsible upright framework, a pair of rods affixed to a lower portion of said framework in spaced relationship one with the other, said rods positioned in a horizontal plane with the ends thereof protruding from said central framework, a pair of fireboxes having aligned openings formed in opposite walls thereof, the ends of said rods positioned through pairs of said aligned openings whereby to slidably support said fireboxes on said rods, and reflector members hingedly mounted one on each of said fireboxes, said reflector members extending upwardly and adjacent said central framework.

6. The portable cooking device of claim 5 in which said framework is provided with a top yoke having V-shaped end members, a food-supporting-member depending from said yoke, said food-supporting-member comprising a pair of nested trays hingedly connected together at the lower ends thereof, the top ends of said trays affixed respectively to handle strips, and upwardly protruding hooks affixed to said handle strips for removably supporting said member from the yoke.

7. The portable cooking device of claim 5 in which each of said reflector members comprise a housing defined by a pair of side walls, a top wall and a front wall having an inclined segment and a lower vertical segment, a complementary shaped reflector plate removably positioned in said housing, said reflector plate formed with a plurality of outwardly protruding spaced ridges, and a handle affixed to each of said housings.

8. In a portable barbecuing device of the character described, a pair of horizontally-disposed parallel spaced apart bars, a plurality of legs supporting said bars, a combination reflector and food supporting tray mounted on said bars, a firebox mounted on said bars, said tray and firebox movable in a horizontal plane one with respect to the other, a reflector hood hingedly mounted on said firebox, and a food-supporting-member removably supported by said tray adjacent said reflector member, said reflector hood open only at the side adjacent said food supporting member.

9. A portable barbecue device comprising an upright central framework, a pair of horizontally disposed parallel rods supported in spaced relationship one with the other by a lower portion of said framework with the ends of said rods protruding from both sides of the framework, a pair of substantially rectangular shaped fireboxes slideably mounted on said rods one on each side of said framework, a pair of reflector housings hingedly mounted one on each of said fireboxes, said framework formed with pairs of upright standards spaced one from the other, and a plurality of food-supporting trays supported one above the other in spaced-apart horizontal planes by said upright standards.

10. The barbecue device of claim 9 in which said food-supporting trays are inclined toward the centers thereof with drip openings formed at the apexes thereof, said trays extending beyond the sides of said central framework and over said fireboxes.

11. The barbecue device of claim 9 in which each of said reflector housings comprises a pair of parallel vertical side walls connected by a front wall with an internally formed arcuate top wall, the upper portion of said reflector housing extending over said food-supporting trays whereby heat from said fireboxes is directed downwardly on said trays.

12. The barbecue device of claim 9 in which each of said reflector housings comprises a pair of parallel vertical side walls connected by a front wall with an integrally formed arcuate top wall, said front and top walls each having formed therein a horizontal indentation to afford an inner baffle reflector for directing heat from said firebox.

References Cited in the file of this patent

UNITED STATES PATENTS

| | | |
|---|---|---|
| 137,278 | York | Mar. 25, 1873 |
| 207,286 | Killin | Aug. 20, 1878 |
| 211,492 | Bissell | Jan. 21, 1879 |
| 730,525 | Edgar | June 9, 1903 |
| 814,752 | Walker | Mar. 13, 1906 |
| 1,507,733 | Harding | Sept. 9, 1924 |
| 1,587,023 | Mottlau | June 1, 1926 |
| 1,656,181 | Elbert | Jan. 17, 1928 |
| 2,314,772 | Corra | Mar. 23, 1943 |
| 2,349,617 | Gorman | May 23, 1944 |
| 2,441,190 | Fuller | May 11, 1948 |
| 2,469,885 | Molla | May 10, 1949 |
| 2,720,827 | Del Francia | Oct. 18, 1955 |
| 2,772,627 | Newell | Dec. 4, 1956 |
| 2,821,187 | Tescula | Jan. 28, 1958 |

FOREIGN PATENTS

| | | |
|---|---|---|
| 135,623 | Great Britain | Dec. 2, 1919 |